United States Patent [19]

Wiggins

[11] Patent Number: 5,176,830
[45] Date of Patent: Jan. 5, 1993

[54] FILTER SUPPORT FOR DISPOSABLE COFFEE FILTERS

[76] Inventor: Lawrence E. Wiggins, 424 S. Robertson St., Clayton, N.C. 27520

[21] Appl. No.: 857,250
[22] Filed: Mar. 25, 1992
[51] Int. Cl.⁵ .......................................... B01D 29/085
[52] U.S. Cl. ..................................... 210/477; 210/482
[58] Field of Search ............... 210/473, 477, 478, 479, 210/482, 232, 238; 99/265

[56] References Cited

U.S. PATENT DOCUMENTS

| | | | |
|---|---|---|---|
| 299,706 | 6/1884 | Webster | 210/478 |
| 3,388,804 | 6/1968 | Hester | 210/479 |
| 4,728,425 | 3/1988 | Sandvig | 210/477 |
| 4,735,719 | 4/1988 | Benedict | 210/479 |
| 4,765,896 | 8/1988 | Hartley et al. | 210/479 |
| 4,865,737 | 9/1989 | McMichael | 210/477 |
| 4,885,987 | 12/1989 | Franke et al. | 210/479 |
| 4,963,262 | 10/1990 | Johnstone | 210/477 |
| 5,064,533 | 11/1991 | Anson | 210/479 |

Primary Examiner—Robert A. Dawson
Assistant Examiner—W. L. Millard
Attorney, Agent, or Firm—Rhodes, Coats & Bennett

[57] ABSTRACT

A filter support fits inside a disposable coffee filter within the filter basket of an automatic drip coffee maker to prevent the side walls of the coffee filter from collapsing while coffee is being brewed. The filter support includes a base frame which rests on the bottom of the coffee filter, and a plurality of retaining members extending upwardly from the base frame for engaging the side walls of the coffee filter. The base frame includes first and second sets of horizontally extending cross members disposed at an angle to one another such that the cross members of each set intersect and join the cross members of the other set. The retaining members extend upwardly from the ends of the cross members and terminate in a free upper end. The cross members may include a downwardly extending portion which forms a leg to support the cross members in vertical spaced relation with respect to the bottom of the coffee filter.

9 Claims, 2 Drawing Sheets

FILTER SUPPORT FOR DISPOSABLE COFFEE FILTERS

FIELD OF THE INVENTION

The invention relates generally to filter devices for use in connection with automatic drip coffee makers, and more particularly to a filter support or retainer to prevent the side walls of a paper filter in the filter basket of a coffee maker from collapsing during use.

BACKGROUND OF THE INVENTION

Conventional automatic drip coffee makers utilize a removable filter basket and paper filter to hold the coffee grounds while coffee is brewed. The filter basket is usually supported by a flange which engages with tracks in the coffee maker. The paper filter is disposed inside the filter basket, and the coffee grounds are placed on top of the filter. Water from the coffee maker is poured over the coffee grounds and passes through the paper filter. The hot water then flows through a small opening in the bottom of the filter basket into a coffee pot or other container disposed beneath the basket.

One problem which has been encountered with automatic drip coffee makers is that the paper filter tends to collapse so that a portion of the water flows over the top of the filter rather than through the filter. When the walls of the filter collapse, coffee grounds may be washed over the filter and into the pot of coffee being made.

In an effort to prevent the paper filter from collapsing during use, the walls of the filter are usually pleated. The pleats in the side walls of the filter provide some strength and rigidity. However, despite the presence of pleated side walls, there is still a problem with the side walls of the filter collapsing during use. Accordingly, there is a need for some type of filter support to prevent the side walls of the filter from collapsing during use.

Attempts have been made in the past to provide means for holding the side walls of the filter in an upright position. Several manufacturers of coffee makers have provided clips on the top edge of the filter basket to engage the edge of the filter and hold it in place during use. Another approach which has been tried is to use a radially expandable ring which fits into a circumferential groove in the filter basket. The top edge of the filter paper is pressed into the circumferential groove and held there by the expandable ring. Such devices add to the cost of the coffee maker and are not widely used.

Other devices used to support disposable coffee filters are disclosed in the patents to Benedict, U.S. Pat. No. 4,735,719; Sandvig, U.S. Pat. No. 4,728,425; McMichael, U.S. Pat. No. 4,865,737; and Johnston, U.S. Pat. No. 4,963,262. The Benedict patent teaches a circular frusto-conical shaped plastic filter support which wedges itself in the filter basket. The patent to Sandvig discloses a similar frusto-conical shaped filter support, but which rests against the bottom of the filter basket. The patent to McMichael discloses a cylindrical, wire-mesh filter support having an open top and bottom which rests against the bottom of the filter basket. The patent to Johnston discloses a ring-like filter support having downwardly projecting legs which support the ring in a predetermined position within the filter basket.

These prior art devices share one or more of the following disadvantages. Some of the prior art filter supports tend to flatten the pleats in the side walls of the filter thereby interfering with the filtration process. Others have large surface areas on which the coffee grounds collect thereby preventing uniform distribution of the grounds. Moreover, most of the prior art devices are sized and shaped to fit the coffee basket of a particular type of coffee maker and are not useable in connection with different types. Accordingly, an improved filter support which overcomes these problems is needed.

SUMMARY AND OBJECTS OF THE INVENTION

The present invention relates to a coffee filter support or retainer for maintaining the side walls of a disposable paper filter in an upright position within the filter basket. The filter support of the present invention includes a base portion including first and second sets of cross-members which intersect at right angles to one another. A plurality of retaining elements extend upwardly from the outer ends of the cross-members and terminate in a free end disposed slightly below the top edge of the paper filter. The filter support loosely fits inside the paper filter. The weight of the filter support presses the filter against the bottom of the filter basket, while the retaining elements prevent the side walls from collapsing inwardly.

Based on the foregoing, it is a primary object of the present invention to provide a filter support which is used in automatic drip coffee makers to retain the side walls of the paper filter in an upright position while coffee is being brewed.

Another object of the present invention is to provide a filter support for an automatic drip coffee maker which does not have to interfit with any other components of the coffee maker.

Another object of the present invention is to provide a filter support for an automatic drip coffee maker which has a small surface area and which does not interfere with the filtration of the brewed coffee through the filter.

It is another object of the present invention to provide a filter support for an automatic drip coffee maker which is adaptable for use with many different styles of filter baskets.

A further object of the present invention is to provide a filter support for an automatic drip coffee maker which does not block or interfere with the distribution of the coffee grounds inside the filter.

Yet another object of the present invention is to provide a filter support for an automatic drip coffee maker which is inexpensive to manufacture and easy to use.

Yet, another object of the present invention is to provide a filter support for an automatic drip coffee maker in which the retaining element for supporting the side walls of the filter can be adjusted by the user.

Other objects and advantages of the present invention will become apparent and obvious from a study of the following description and the accompanying drawings which are merely illustrative of such invention.

DETAILED DESCRIPTION OF THE INVENTION

Figure 1:
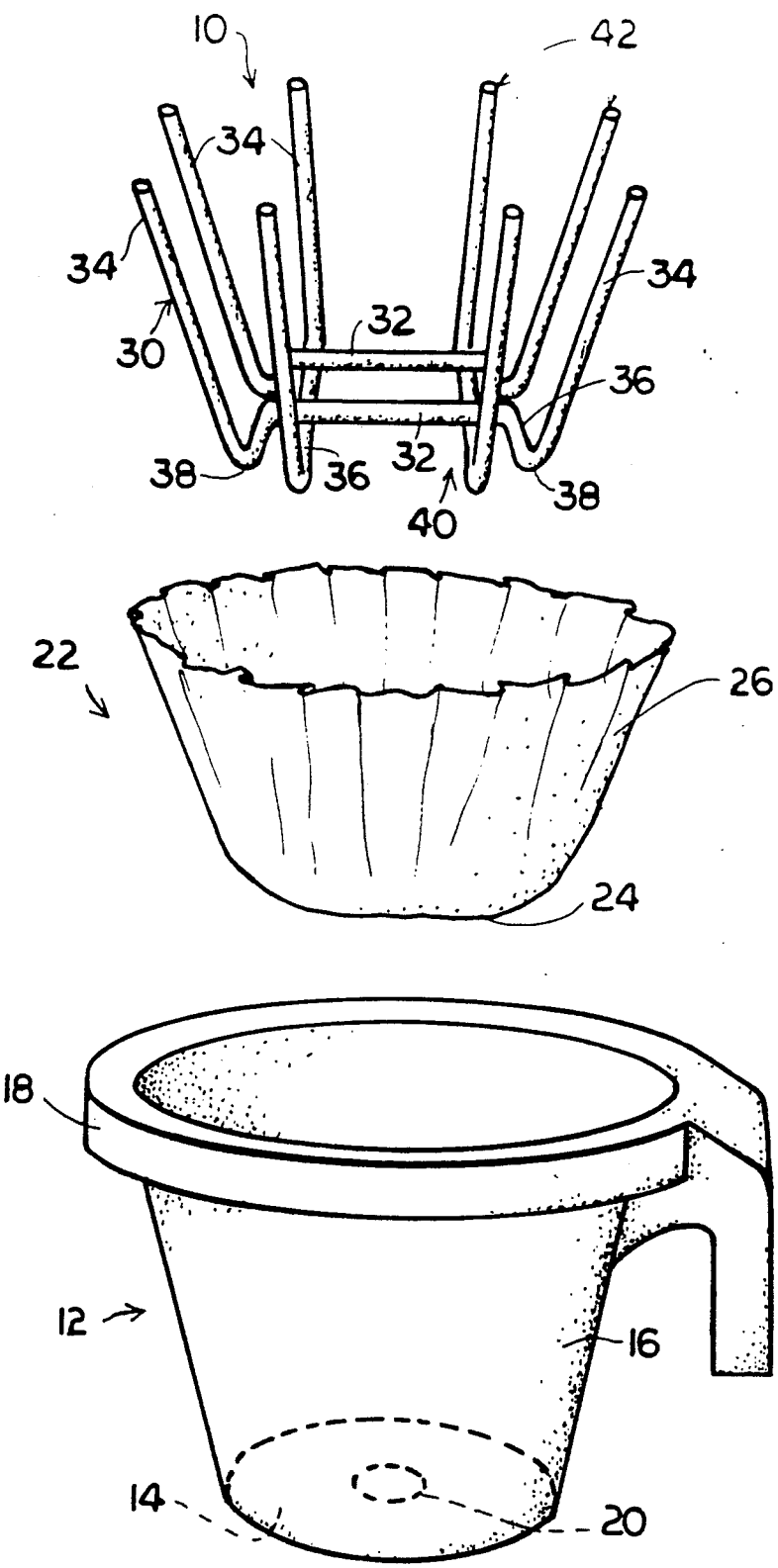
FIG. 1 is an exploded perspective view showing a filter basket for an automatic drip coffee maker, a disposable coffee filter, and the filter support of the present invention.
Figure 2:
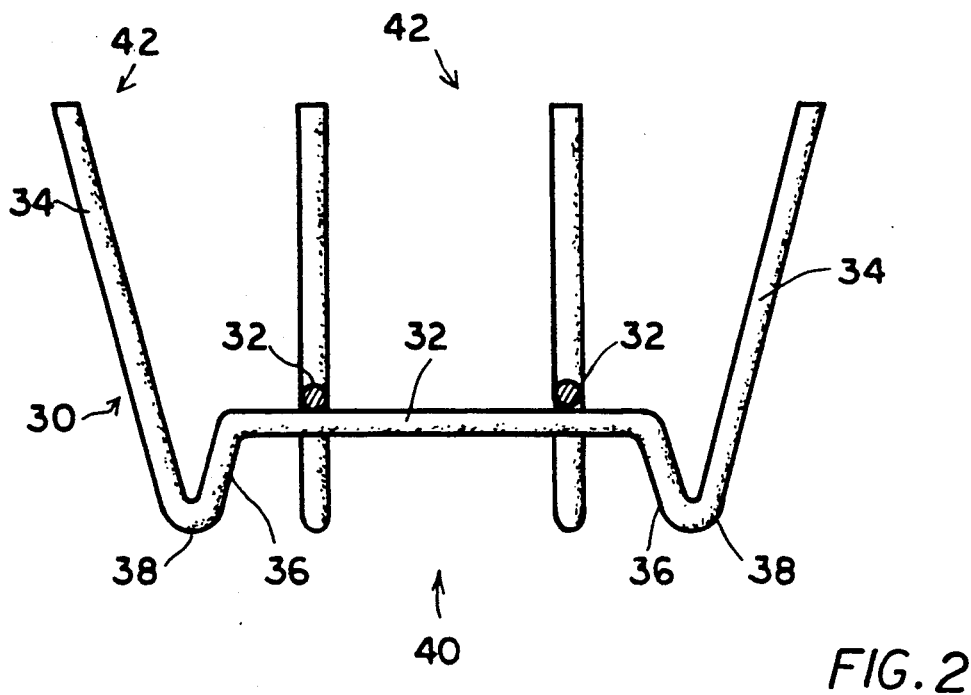
FIG. 2 is a side sectional view of the filter support of the present invention.
Figure 3:
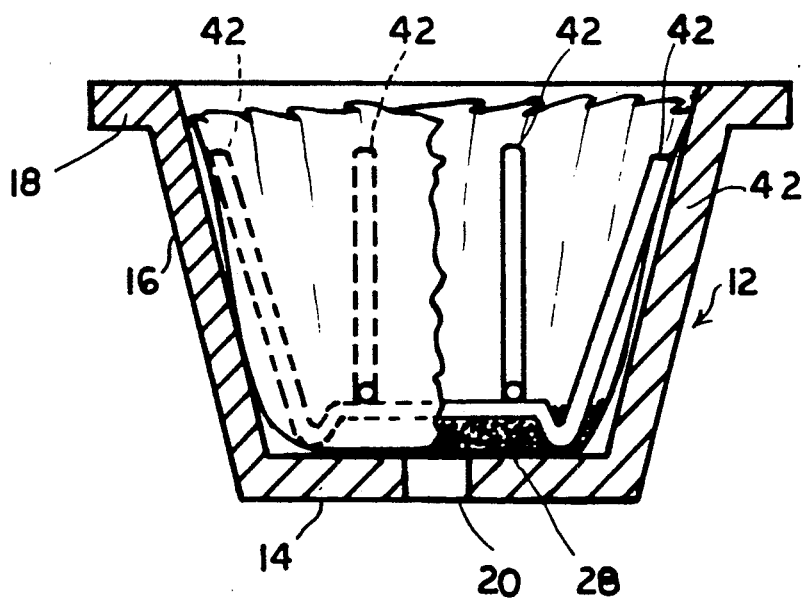
FIG. 3 is a fragmentary cross-sectional illustration of the filter basket, coffee filter, and filter support of the present invention.

Referring now to the drawings, the filter support of the present invention is shown therein and indicated generally by the numeral 10. The filter support 10 of the present invention is used in a conventional automatic drip coffee maker. The coffee maker (not shown) typically includes a heating pad of which a coffee pot is situated, and a water heating unit which is disposed in the upper portion of the coffee maker above the heating pad. A filter basket, shown in the drawings and designated by the numeral 12, is mounted on the water heating section so that hot water passes through the filter basket 12 and into the coffee pot.

The filter basket 12, typically includes a bottom 14 and side walls 16 which extend upwardly and outwardly from the bottom 14. A flange 18 projects outwardly from the top edge of the side walls 16 and slides into opposing tracks (not shown) on the heating unit of the coffee maker. An opening 20 is formed in the bottom 14 of the filter basket 12 through which the brewed coffee flows.

To brew coffee, a paper filter 22 is placed inside the filter basket 12. The filter 22 includes a bottom 24 and a pleated side wall 26. The bottom 24 of the filter rests against the bottom 14 of the filter basket 12, while the side walls 26 of the filter 22 extends along the inner side walls 16 of the filter basket 12. Coffee grounds indicated generally at 28, are placed in the bottom of the filter 22 and then the filter basket 12 is mounted to the water heating unit of the coffee maker. Hot water from the coffee maker flows into the open top of the filter 22 and onto the coffee grounds. The flavor components of the coffee grounds are dissolved into the water which must pass through the filter and drain through the opening 20 in the bottom of the filter basket 12.

In use, the side walls 26 of the filter may collapse inwardly such that water being introduced into the filter 22 overflows the side walls 26. When the side walls 26 collapse, some of the coffee grounds may be washed over the top of the filter 22 and into the coffee pot. The filter support of the present invention is specifically designed to support the side walls 26 while coffee is brewed.

The filter support 10 of the present invention includes a horizontal base frame indicated generally at 40 composed of intersecting cross members and a plurality of upwardly extending retaining elements indicated generally at 42. In the disclosed embodiment, the filter support 10 comprises four individual wire members 30 which are identical to one another. Only one wire member 30 will be described herein, it being understood that the remaining three are constructed in the same manner.

Each wire member 30 is made from a piece of wire composed, for example, of stainless steel. Plastic coated steel wire could also be used as well as many types of plastic. The material chosen should be non-corrosive, and have sufficient stiffness to retain its shape while having enough flexibility to bend easily.

The wire member 30 includes an intermediate section 32 which forms a cross-member of the filter support, and outer-end portions 34 which form the retaining elements of the filter support 10. The opposite ends of the intermediate section 32 are bent downwardly to form a transition portion 36. The transition portion 36 extends generally downwardly and outwardly relative to the intermediate portion 32 and then joins the outer end portions 34. The transition portions 36 and the lower end of the outer end portions 34 together form generally u-shaped legs which are indicated generally at 38.

Four individual wire elements 30 are joined to form each filter support 10. More particularly, each filter support 10 includes two pairs of parallel wire elements 30. The two pairs of wire elements 30 are disposed at right angles to one another. The wire elements 30 of each set thus intersect the wire elements 30 of the other set. The wire elements 30 intersect at their respective intermediate sections 32 slightly inward from the transition portion 36. The wire elements 30 are joined at their intersection by braising, soldering or welding the wire members 30 together.

When the wire members 30 are assembled together, the intermediate portions or cross-members 32 form a relatively rigid base frame 40 having downwardly projecting legs 38 which support the base frame 40 in vertical spaced relation above the bottom 24 of the filter 22 such that the cross-members 32 do not engage or interfere with the bottom 24 of the filter 22. The outer ends 34 of the wire members 30 function as a retaining element for supporting the side walls 26 of the filter 22 in an upright position. As can be clearly seen in the figures, the filter support 10 has eight individual retaining elements 42. The retaining elements usually extend upwardly and outwardly from the base of the filter support and terminate slightly below the top edge of the filter. The angle of the retaining elements 42 should preferably match the tapered side wall of the filter basket 12, but such is not critical to the invention. Also, it is generally preferred that the retaining elements 42 be resilient, but also capable of being deformed so that the retaining elements 42 can be bent to conform to the size and shape of the filter basket 12.

In use, a disposable filter 22 is positioned in the filter basket 12 and the filter support 10 is inserted into the filter 22. The weight of the filter support 10 insures that the filter 22 is seated properly in the filter basket 12. Coffee grounds are then poured into the disposable filter 22 and the filter basket 12 is mounted to the coffee maker. Water flows from the coffee maker onto the coffee grounds and the grounds become evenly distributed along the bottom and sides of the filter 22. After absorbing some of the components of the coffee grounds, the water seeps through the filter 22 and passes through the aperture 20 in the bottom of the filter basket 12. The brewed coffee flowing from the aperture 20 in the filter basket 12 is collected in a coffee pot. When the filtering process is complete, the filter basket 12 is removed from the coffee maker, the filter support 10 is removed from the filter basket 12 and rinsed with water, and the disposable filter 22 is removed and discarded.

Based on the foregoing, it is apparent that the filter support 10 of the present invention prevents the side walls 26 of the filter 22 from collapsing during use without interfering with the distribution of the coffee grounds within the filter 22 or the functioning of the filter element. Further, it should be apparent from the foregoing description that a filter support 10 constructed in accordance with the present teachings can be used with different sizes and shapes of filter baskets 12. For example, the filter support 10 of the present invention works equally well with square or round filter baskets, and can be adjusted to conform to different sizes of filter baskets 12 by simply bending the retaining members inwardly or outwardly as needed. Thus, the filter support 10 of the present invention is more versatile than most prior art filter supports which are specifically designed for particular types of filter baskets. Finally, the filter support 10 of the present invention does not flatten the pleats of the coffee filter as many prior art devices do which utilize a continuous ring to hold the filter in place.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A filter support adapted to fit inside a disposable coffee filter within the filter basket of a coffee maker for supporting the sidewalls of the disposable coffee filter, said filter support comprising:
   (a) a base frame which rests on the bottom of the coffee filter including first and second sets of horizontally extending cross members disposed at an angle to one another such that the cross members of each set intersect and join the cross members of the other set to form a relatively rigid open frame;
   (b) a plurality of retaining members extending upwardly from the base frame for engaging the sidewalls of the coffee filter to maintain the sidewalls in an upright position, said retaining members including a lower end connected to a respective cross member of the base frame and a free upper end.

2. The filter support of claim 1 wherein the base frame includes downwardly extending legs integrally formed with the cross members for supporting the cross members in vertical spaced relation above the bottom of the coffee filter.

3. The filter support of claim 2 wherein the legs of the base frame are generally u-shaped and are connected at one end of the cross members and at the opposite end to the retaining members.

4. The filter support of claim 1 wherein the retaining members extend upwardly and outwardly from the base frame.

5. A filter support adapted to fit inside a disposable coffee filter within the filter basket of a coffee maker for supporting the sidewalls of the coffee filter, said filter support comprising: an open frame structure having a base portion and a plurality of upwardly extending retaining elements, said frame structure being composed of a plurality of individual wire members, each said wire member including a generally horizontal intermediate portion joined with the intermediate portions of at least one other wire member such that the intermediate portions collectively form said base portion, and outer end portions extending upwardly from opposite ends of the intermediate portion to form the retaining members, wherein the wire members are arranged into at least two sets of wire members, and wherein the wire members of each set are parallel to the other wire members in the same set and are disposed at an angle to the wire members of the opposite set.

6. The filter support of claim 5 wherein the intermediate portion of the wire members includes a downwardly extending section forming a leg for supporting the intermediate portions of the wire member in vertical spaced relationship above the bottom of the filter.

7. The filter support of claim 6 wherein the intermediate portions of wire members in one set of wire members intersect and join the intermediate portions of the wire members of the other sets.

8. A filter support adapted to fit inside a disposable coffee filter within the filter basket of a coffee maker for supporting the side walls of the disposable coffee filter, said filter support comprising:
   (a) a base frame composed of a plurality of intersecting wire elements;
   (b) a plurality of individual retaining elements extending upwardly from the base frame for engaging the side walls of the coffee filter at discrete locations to support the side walls in an upright position without flattening the filter, said retaining elements including a lower end connected to the base frame and terminating in a free upper end, and wherein said individual retaining elements are deformable so as to permit adjustment for differently sized filter baskets.

9. The filter support of claim 8 further including a plurality of legs integrally formed with the base frame for supporting the base frame in spaced relationship above a bottom of the filter basket.

* * * * *